United States Patent [19] [11] 4,194,817
Staudacher et al. [45] Mar. 25, 1980

[54] MARKING OF INTERSPERSED MOTION-PICTURE SCENES AND STILL SHOTS WITH INTERRUPT-TRANSPORT MARKINGS

[75] Inventors: Frank Staudacher, Haan; Otto Stemme, München; Peter Lermann, Narring; Werner Went, Leverkusen; Volkmar Stenzenberger, Unterhaching; Eberhard Herzig, Cologne; Friedrich Stumpf, München; Thomas Scheller, München; Jürgen Sylla, München; Friedrich Winkler; Johann Zanner, both of Unterhaching, all of Fed. Rep. of Germany

[73] Assignee: AGFA-Gevaert, A.G., Leverkusen, Fed. Rep. of Germany

[21] Appl. No.: 950,127

[22] Filed: Oct. 10, 1978

[30] Foreign Application Priority Data

Oct. 13, 1977 [DE] Fed. Rep. of Germany ....... 2746036

[51] Int. Cl.² ............................................. G03B 21/38
[52] U.S. Cl. ...................................... 352/169; 352/92; 352/191; 352/137; 352/124
[58] Field of Search ................. 352/169, 92, 137, 121, 352/191, 194, 124

[56] References Cited

U.S. PATENT DOCUMENTS

| 1,944,024 | 1/1934 | Foster et al. | 352/124 |
| 1,960,061 | 5/1934 | Morsbach | 352/169 |
| 3,301,628 | 1/1967 | Hellmund | 352/169 |
| 3,309,163 | 3/1967 | White | 352/92 |
| 3,447,864 | 6/1969 | Shadley | 352/169 |
| 3,520,596 | 7/1970 | O'Donnell | 352/92 |
| 3,591,265 | 7/1971 | Shropshire | 352/169 |
| 3,851,959 | 12/1974 | Kreutze et al. | 352/169 |
| 3,958,872 | 5/1976 | Roth | 352/169 |

Primary Examiner—Monroe H. Hayes
Attorney, Agent, or Firm—Michael J. Striker

[57] ABSTRACT

The user of a motion-picture camera selects between motion-picture and single-exposure operation, and presses a release member to initiate shooting, letting go of it to terminate motion-picture shooting. Each time the user lets go of the release member, an internal device provides an interrupt-transport marking alongside the just exposed film frame, or phase shifted relative thereto. Alternatively, the interrupt-transport marking is provided the next time the user presses the release member. In this way, the terminal frame of each motion-picture scene, and each and every one of the interspersed single-exposure shots, is provided with an interrupt-transport frame marking. Thus, if the film is run through a reproducing apparatus provided with a marking detector, detection of each interrupt-transport marking during motion-picture reproduction causes the terminal frame of each motion-picture scene, and also each one of the still shots, to be persistently reproduced as a still image. The interrupt-transport markings could alternatively be provided by such a device in a reproducing apparatus.

3 Claims, 13 Drawing Figures

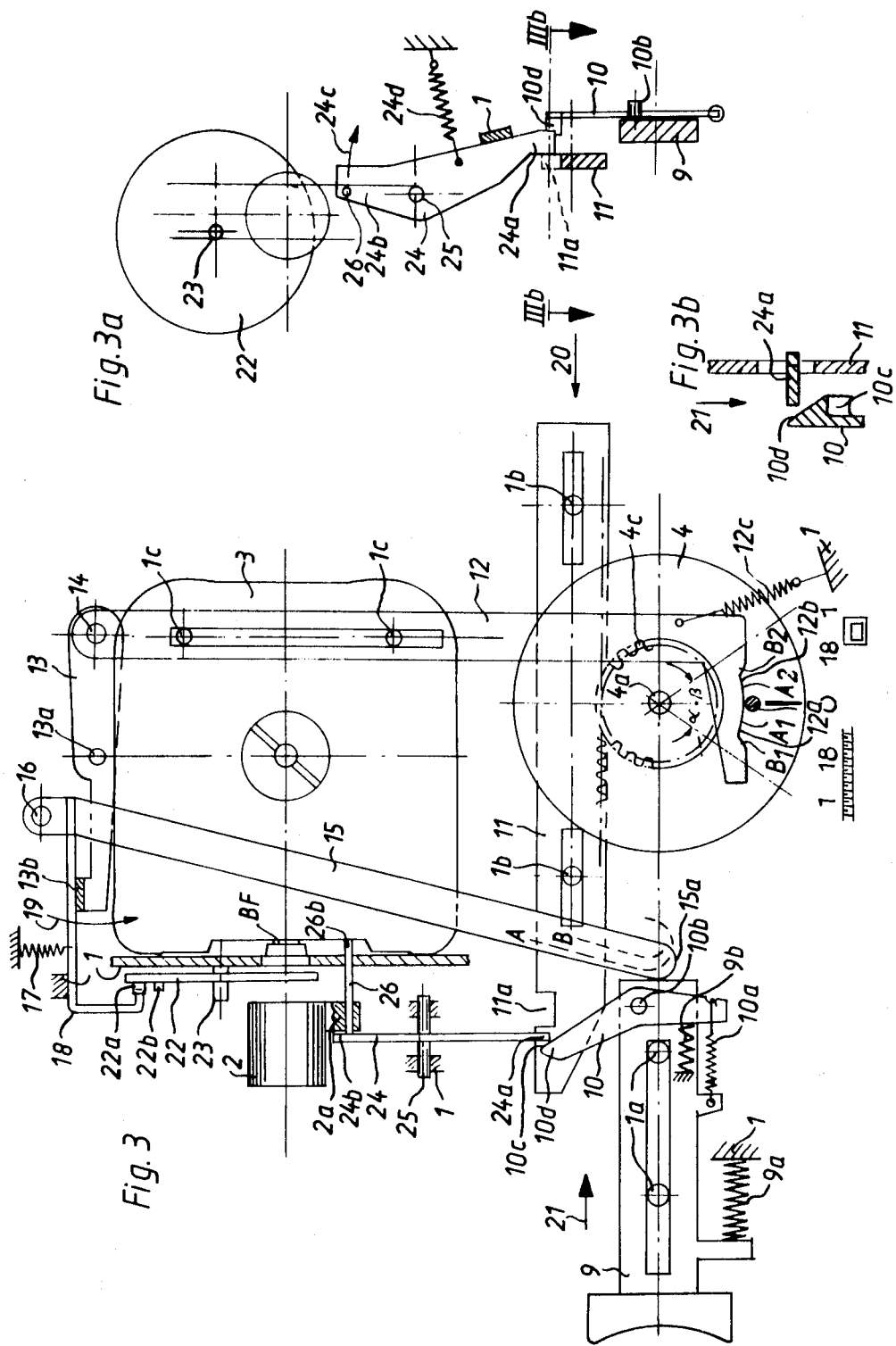

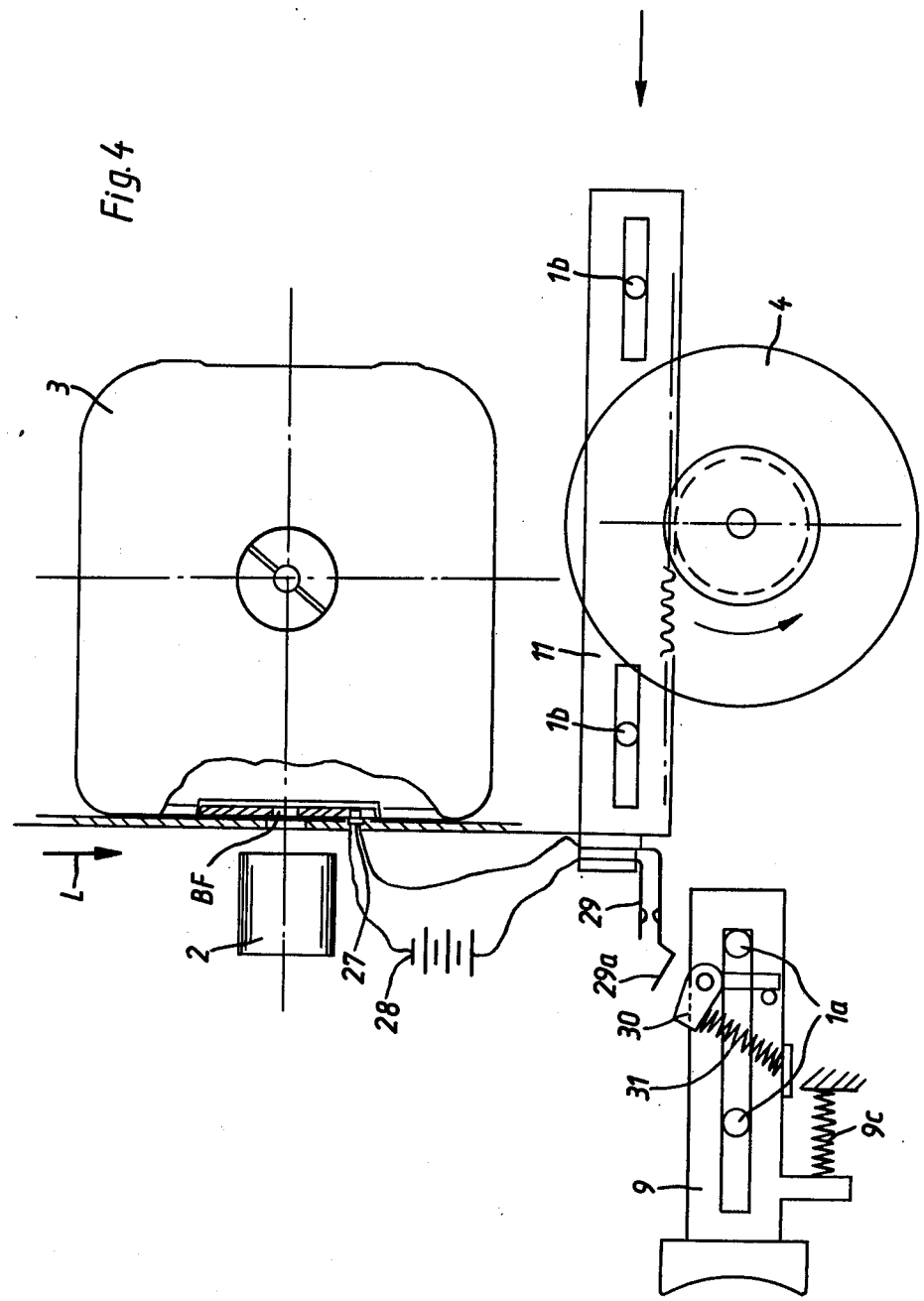

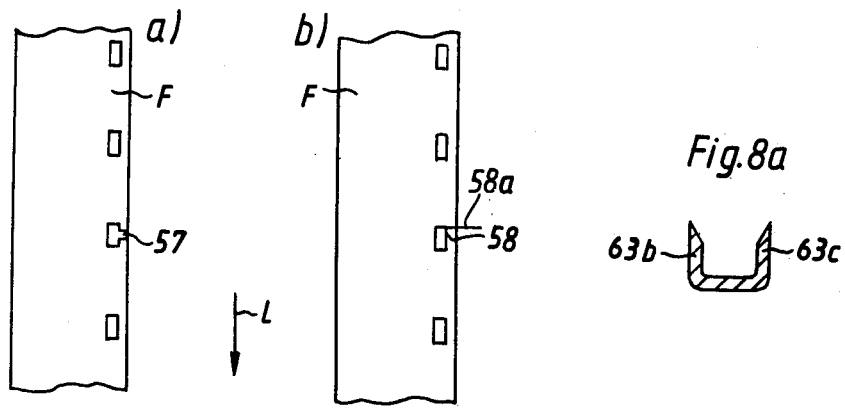
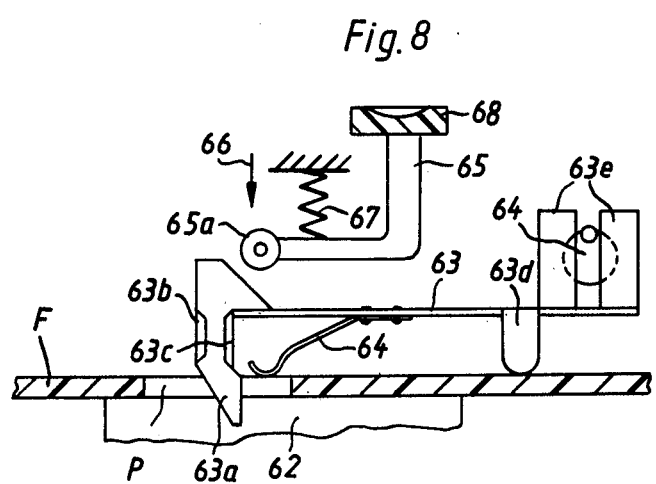

MARKING OF INTERSPERSED MOTION-PICTURE SCENES AND STILL SHOTS WITH INTERRUPT-TRANSPORT MARKINGS

BACKGROUND OF THE INVENTION

The present invention concerns the use of recording media, especially but not necessarily motion-picture film, for mixed recording of motion-picture scenes and interspersed still images.

The concept of interspersing still images with motion-picture scenes on motion-picture film has long been known. For example, in the days of silent movies, it was a common practice to project the dialogue titles as stills intermediate motion-picture scenes, to economize on the amount of film needed. More recently, a variety of audio-visual machines, especially teaching machines, have the capability of projecting film partly in a moving-image mode and partly in a still-image mode, in accordance with a preestablished program. The interruption of the projector's film transport system is controlled either by optically scanned markings on the film or by magnetic signals recorded on a control tape for the projector.

The known techniques and equipment of this type are complex and expensive, and therefore exclude the amateur or hobbyist from the possibility of saving on film by using motion-picture film for interspersed motion-picture scenes and still shots. In particular the preparation of programs using commercially available equipment exceeds the abilities of the average amateur, and is typically done by specialist firms for special applications.

With motion-picture projectors, it is a common capability to be able to interrupt film transport so that, at least for a limited period of time, a single film frame can be projected in the manner of a still shot. Also, some projectors are provided with a buffer-loop feature, so that at any desired point of the film normal-speed projection can be terminated and the projector speed then decreased or increased for special effects purposes.

A typical conventional cassette-type motion-picture film, when exposed at the normal rate of about 18 frames per second, provides a film duration of somewhat more than three minutes. Slide film of comparable purchase price affords thirty-six exposures. If one assumes that a motion-picture scene averages fifteen seconds, then a motion-picture film affords about fifteen scenes. If one assumes that a slide is projected on the average for about fifteen seconds before going on to the next slide—and in general the viewing time is longer—then it becomes apparent that the viewing time afforded by such a slide film is about three times as long as that afforded by a motion-picture film.

This ratio can be exploited with motion-picture projectors having the capability to project a single film frame as a still, or having the capability of slowing down the film-projection speed, i.e., to increase in a visually appropriate manner the amount of viewing time which the motion-picture film of given length provides. However, if the operator is to do this manually during projection of the film, he must be extremely alert and quick, a rather impractical possibility. Furthermore, in the case where, for example, a single still-shot frame intervenes between two motion-picture scenes, the operator may indeed have no way of knowing that the still-shot frame is present on the film and that he should manually stop film transport to project it as a still.

Automatic prolonging of the viewing time afforded by motion-picture projection would for the reasons explained above by very desirable, i.e., if the operator did not have to intervene in this complicated way.

Even more importantly, for ordinary amateur purposes, it would be particularly desirable to be able to record motion-picture scenes and still shots interspersed therewith on a single motion-picture film, using a single motion-picture camera and thereafter a single reproducing apparatus. In particular, if still shots are to be taken in substantial numbers, then the possibility of using the comparatively enormous length of a motion-picture film for still shots, but without limitation upon the interspersing of motion-picture scenes, would afford the average user a very great economy, and also result in space-savings when such films are stored.

SUMMARY OF THE INVENTION

Accordingly, it is the general object of the invention to provide a method and apparatus which better utilize the capabilities of motion-picture film in the sense described above, but in such a way as to require little or no intervention by the user, and furthermore in a way which is as simple and inexpensive as possible.

In accordance with the present invention, this is achieved by providing certain frames of the motion-picture film—i.e., when motion-picture film is the recording medium involved—with interrupt-transport markings which, when the film is run through a reproducing apparatus, can be detected by a marking detector and used to interrupt film transport.

In accordance with one concept of the invention, each single-exposure shot on the motion-picture film is provided with an interrupt-transport marking. Additionally, for example the terminal frame of each motion-picture scene can be provided with an interrupt-transport marking. In this way, when the film is projected in normal fashion, and when the film comes to a single-exposure shot, that frame is projected as a still image. If the terminal frame of each motion-picture scene too is provided with an interrupt-transport marking, then each terminal frame will likewise be projected as a still image, e.g., for the sake of a better transition from motion-picture to still projection. An automatic time-delay device can be provided so that each still image projection will last a predetermined appropriate time interval, whereupon the next motion-picture scene will commence or the next single-exposure shot projected as a still. Even if the operator is called upon to press a button or the like to terminate still image projection and resume film transport, the inconvenience to him is evidently minimal.

The particularly cost-conscious photographer may, in the extreme case, use the motion-picture film to take still shots exclusively, yielding ca. a hundredfold gain in the number of still shots which can be taken, but at all times retaining the ability to select motion-picture-filming of a particular scene. A commercial moiton-picture cassette film will have, for example, a length on the order of three thousand single frames.

Actually, besides interspersing single-exposure shots with motion-picture scenes, another capability or aesthetic which emerges with the present invention has been found to reside in the stretching out of motion-picture scenes by still-image projection of the terminal frame of each scene, i.e., irrespective of whether the film has also been used to take single-exposure shots. It has been found that still-image projection of the terminal frame of each motion-picture scene, particularly for example in contexts such as family vacation home-movies and the like, has an agreeable aesthetic effect for the viewers. For example, the motion-picture scenes filmed may often be of rather short duration and of subject matter not of a particularly dynamic visual character, e.g., short motion-picture scenes of landmark buildings, nature scenes, and the like. Still-image projection of the terminal frame in each motion-picture scene of that type can, for example, extend the length of time in which the photographed subject can be discussed by the viewers, in a way which is per se aesthetically convincing and furthermore prevents the hurried effect of projecting a sequence of short motion-picture scenes without interruption. Indeed, the technique of projecting as a still the terminal frame of each motion-picture scene proves to be so natural a one, that the increase in viewing duration tends considerably to exceed the aforementioned factor of three.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIGS. 3 and 3a-3d depict an exemplary motion-picture camera provided with optomechanical means for automatically providing the film with end-of-scene and single-exposure frame markings;

FIG. 4 depicts a motion-picture camera provided with an electrooptical marking device.

FIGS. 7a and 7b depict two different types of mechanically applied frame markings;

FIG 8 depicts a film transport mechanism provided with cutting means for forming the frame markings of FIGS. 7a or 7b; and FIG. 8a separately depicts the cutting means of FIG. 8.

DESCRIPTION OF THE PREFERRED EMBODIMENTS

Figure 1:
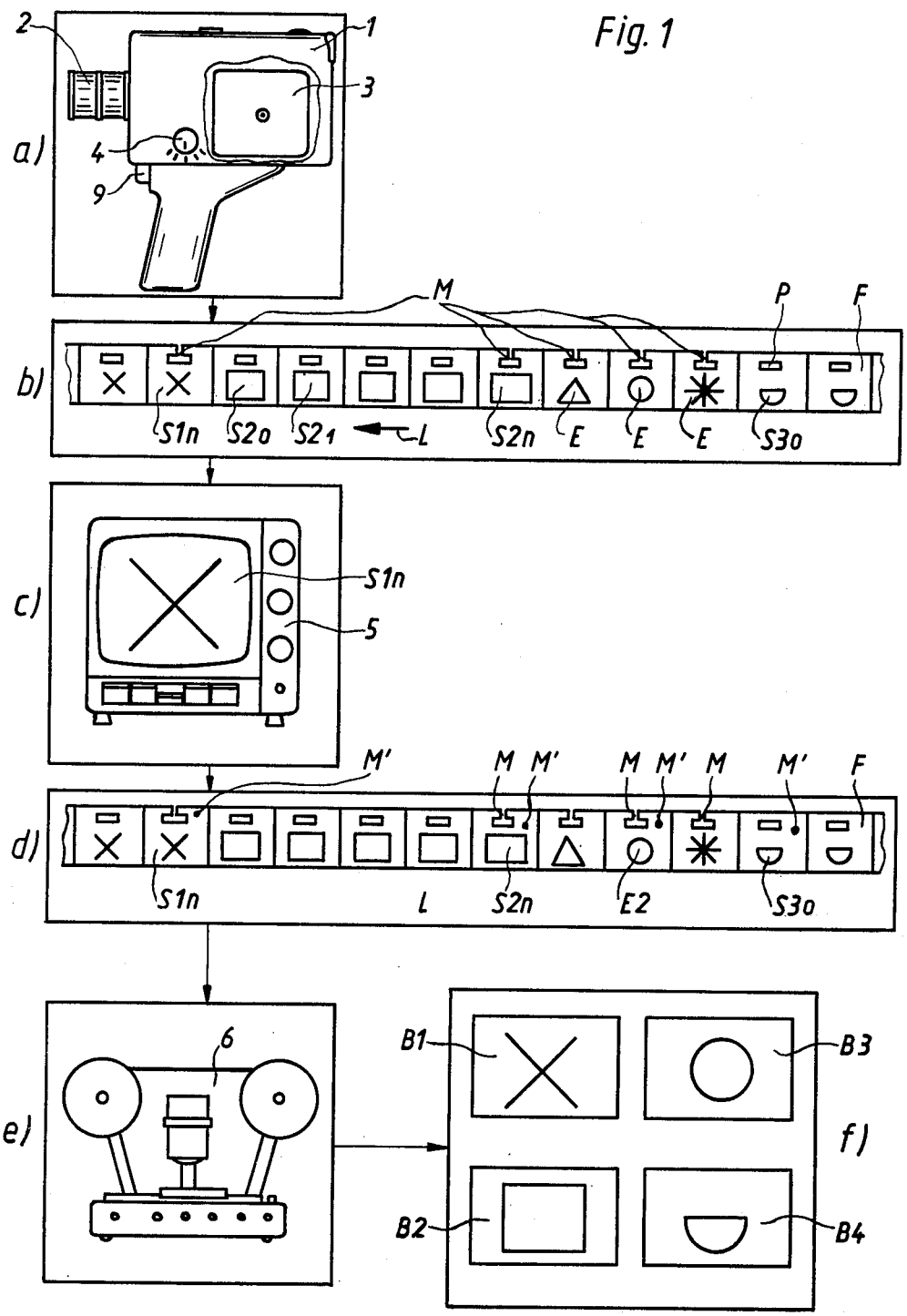
FIG. 1 is an explanatory diagram illustrating the technique of the present invention.

FIG. 1 schematically illustrates the applicability of the present invention to intermixed motion-picture and single-exposure recording and reproduction. At step a, a camera 1 containing a film cassette 3 exposes a film frame through the camera objective 2 when the user depresses the camera release button 9. By means of a rotary selector switch 4, the user can select between motion-picture and single-exposure operation.

The camera 1 includes a marking arrangement which in response to activation of the camera release 9 provides a special frame marking on the film. The marking arrangement can take a variety of forms, some of which are described below for illustrative purposes.

The exposed film F, automatically provided in the camera with certain frame markings, is developed in conventional manner whereupon it has the appearance depicted at step b. As shown at b, the film frames comprise motion-picture scenes interspersed with single-exposure shots, this being represented by the crosses, boxes, the triangle, the circle and so forth. The film perforations P are shown enlarged for the sake of illustration, and the height-to-width ratio of the film frames and of the marginal portions of the frames are not actually in correspondence to those of conventional cassette motion-picture film. The last frame $S1_n$ of the first scene (indicated by crosses) is provided at its edge with an end-of-scene frame marking M. Next comes a scene (indicated by boxes) which, although shown as consisting of two film frames would of course typically comprise many more. The last frame $S2_n$ of this second scene is likewise provided with an end-of-scene frame marking M.

At step c, the film is transported through motion-picture reproducing apparatus 5 which responds to each frame marking, whether an end-of-scene frame marking or a single-exposure frame marking, by interrupting film transport and persistently projecting the one frame so marked. In FIG. 1, frame $S1_n$ is shown viewable on the viewing screen of the apparatus. Also, this reproducing apparatus comprises a marking arrangement of its own which makes possible the provision of additional markings on the edge of the film. For example, at step d, the film is shown provided at its edge with additional markings M' at frames $S1_n$, $S2_n$ and E2. The frame $S3_O$, which is not provided with a marking, is however, provided with a marking M'. The additional markings M', provided by the reproducing apparatus 5 in step c, serve to indicate the film frames from which prints are to be made. Of course, the marking device in reproducing apparatus 5 could provide each successive film frame, whether having a marking M or not, with a print marking M', i.e., for the case where all frames are to be printed.

In the next step e, a conventional printer 6 is provided with a scanning arrangement for the print markings M' and used to make the desired number of copies of each frame having a marking M'. In step f, the prints are sent to the customer. The individual print B1 corresponds to film frame $S1_n$, print B3 to frame $S2_n$, print B3 to the second single-exposure shot E, and print B4 to frame $S3_O$.

The apparatuses used to implement the procedure explained above will be described further below. From the many shots taken, the user can easily select and mark those suitable for copying. In principle, the marking device in the camera could be coupled to the single-exposure mechanism of the camera and not to the camera release member. In that event, the film would be provided only with single-exposure frame markings, and not additionally with end-of-scene frame markings. If the film frames consist of motion-picture scenes interspersed with still exposures, and such film is run through the reproducing apparatus, the motion-picture scenes will be reproduced in conventional manner, and each time the film comes to a still exposure, film transport will be stopped and the still-exposure frame reproduced persistently. However, it has been found that, upon the conclusion of a motion-picture scene, the sudden appearance of a still-projected frame unrelated in image content to the preceding scene, is annoying to the viewer. In contrast, it has been found that there is no such annoying effect if, before projecting a still shot subsequent to a motion-picture scene, the terminal frame of the preceding motion-picture scene is first projected as a still. This provides a better psychological transition from motion-picture viewing to still-picture viewing. Even so, however, the reproducing apparatus can be provided with selector means such that the transport mechanism stops in response to both end-of-scene and also single-exposure frame markings, or else in response to single-exposure frame markings only.

Figure 2:
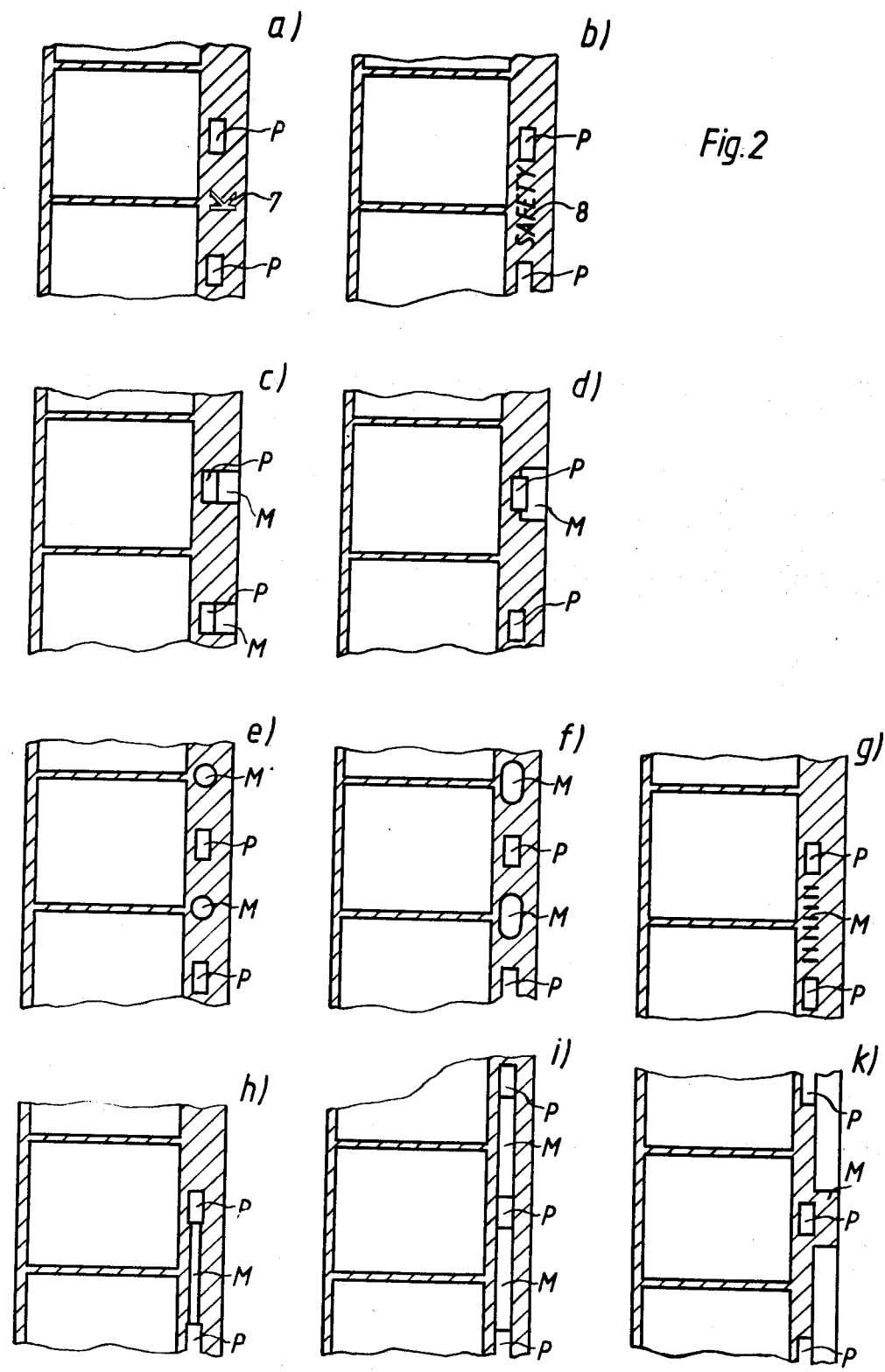
FIGS. 2a to 2k depict various optical frame marking techniques which can be utilized.

For the sake of simplicity in FIGS. 1 and 2, the frame markings are shown right alongside the associated film frames. However, as will become clear from the description of exemplary apparatuses below, in actual practice it is preferable that there be a phase shift or offset as between frame markings and the correlated frames, e.g., in the sense that audio signals recorded on the audio track of a motion-picture film are typically offset from the correlated frames by a distance of 18 frames. More will be said concerning this phase shift further below.

FIGS. 2a–2k depict frame markings of various types provided on the edge of motion-picture film. FIGS. 2a and 2b depict two films between whose perforations P letters or words 7 or 8 are preexposed, which of course should not overlap the frame markings to be provided. Accordingly, the following marking schemes could be used: In FIGS. 2c and 2d, the markings M are provided alongside the film perforations, not between them. Typically, no preexposed inscriptions or the like will be found in this region.

In FIGS. 2e to 2i, the region intermediate film perforations P is utilized for the frame markings M. In that case, care should be taken to assure that the markings M are of greater area than the areas upon which inscriptions 7 or 8 may have been preexposed. Also, if the frame markings M are provided in line with the perforations P, measures may be required to assure that the perforations P do not activate the marking detector of the reproducing apparatus. For example, the marking detector of the reproducing apparatus can be so designed as to be rendered operative or gated during a predetermined point or phase of the one-frame film-transport cycle corresponding to the location where frame markings M would be provided; or alternatively, as shown in FIGS. 2f, 2h and 2, the frame markings M can be substantially larger than the perforations P.

The provision of more complex coded frame markings M is illustrated in FIG. 2g. Here the frame marking M comprises a series of strokes or dots which are sequentially exposed onto the film by automatic means in the camera, during a film-transport operation. Then, in the reproducing apparatus, this more complex frame marking can be identified, for example, by means of an optical pulse-generating sensor feeding pulses to a counter, the counter then producing interrupt-transport signals.

A further marking scheme depicted in FIG. 2k combines the advantages of some of the preceding schemes. Instead of markings constituted by translucent film locations against a denser background, here a light source in the camera is used to form a continuous exposed strip along the perforated edge of the film, the opaque interruptions in this strip then constituting the frame markings M. In particular, the continuous translucent strip with the brief more opaque interruptions M comes into existence after the thusly stripwise-exposed film has been developed using a reversal process. This technique has the advantage that the preexposed inscriptions 7 or 8 of FIGS. 2a or 2b are erased and only the dark markings M remain. Also, it becomes possible to later provide additional markings using a felt pen or other dark-ink marking means, i.e., on the long low-density edge stripes. Of course, it is preferable that no preexposed inscriptions 7 or 8 be present, to begin with.

FIGS. 3 and 3a–3d depict a motion-picture camera provided with an optomechanical marking system embodying the invention concepts. Only components necessary for an understanding of the invention have been illustrated. The camera contains a film cassette 3 provided with an exposure window BF arranged behind the camera objective 2. Located between the objective 2 and the exposure window BF is a rotating sector-type shutter 22 provided with conventional stops 22a and 22b used when causing the shutter to operate alternatively in its single-exposure or motion-picture mode. The conventional drive mechanism for the shutter 22 is not illustrated for the sake of simplicity. Shutter 2 is mounted for rotation about a pin 23 secured to a stationary part of the camera housing. The free left end of a lever 18 can be moved into the path of motion of the stops 22a, 22b or into the clearance between them. Lever 18 is turnable about a stationary pivot 16 and is rigidly connected to a further bent-off lever 15 whose lower end 15a bears against the right end face of the camera release member 9.

A tension spring 17 whose upper end is secured to the camera housing urges the lever 18 upwards, but the latter is upwardly stopped by a projection on camera housing 1. The downward movement of lever 18 is limited by a projecting stop 13b of a lever 13 pivotable about a stationary pin 13a. A pin 14 couples the right end of lever 13 to the upper end of a rod 12. Stationary guide pins 1c guide rod 12 for longitudinal shifting motion. At its lower end, rod 12 is bent off to the left and provided with two cam surfaces 12a and 12b which cooperate with a camming pin 4b carried by a selector switch 4. Radially aligned with camming pin 4b on selector switch 4 in an arrow-like indicium shown pointing to the character "0", i.e., the selector switch 4 being in its arrested setting, wherein depression of camera release 9 will not activate the camera. Selector switch 4, provided for example with a rotary manual knob, can be turned clockwise to an "18" setting and then to a "1" setting, for motion-picture shooting and still-shot shooting respectively, in which the camming pin 4b moves to part A₁ of cam surface 12a and then to part B₁ of cam surface 12a. In a manner described below, when camming pin 4b engages cam surface part A₁ (after setting "18"), depression of camera release 9 will initiate motion-picture shooting without automatic provision of end-of-scene frame markings on the film; likewise, when camming pin 4b engages cam surface part B₁ (left setting "1"), depression of camera release 9 will inititate a still-shot exposure without automatic provision of a single-shot frame marking on the film. If selector switch 4 is turned counterclockwise from its illustrated "0" setting, pin 4b engages part A₂ of camming surface 12b (right setting "18"), and depression of camera release 9 initiates motion-picture shooting with automatic provision of end-of-scene frame markings on the film; likewise, when camming pin 4b engages cam surface part B₂ (right setting "1"), depression of camera release 9 initiates a single-shot exposure with automatic provision of a single-shot frame marking on the film. Thus, the user can lock the camera against activation, can select motion-picture shooting with or without automatic provision of end-of-scene frame markings on the film, and can select single-shot shooting with or without automatic provision of single-shot frame markings on the film.

Specifically, when selector switch 4 is turned to either of the "18" settings ($A_1$ or $A_2$), camming pin 4b presses upwards against camming surface 12a, 12b and displaces rod 12 upwards a predetermined first distance. If selector switch 4 is turned to either of the "1" settings ($B_1$ or $B_2$), camming pin 4b presses upwards against camming surface 12a, 12b to a further extent, displacing rod 12 upwards to a second further distance. A tension spring 12c urges rod 12 downwards. Selector switch 4 is provided with toothing 4c meshing with the toothing of a rack 11. Rack 11 is mounted by stationary pins 1b for longitudinal displacement and is provided at its upper left side with a notch 11a. Notch 11a is located in the region of the lower end 24a of a light-blocking member 24 pivotally mounted on a stationary pin 25. Normally, the lower end 24a of blocking member 24 is located in front of rack 11 as viewed in FIG. 3, and to the right of rack 11 as viewed in FIG. 3a. Under certain conditions described below, the light-blocking member 24 can pivot clockwise as viewed in FIG. 3a such that its lower end 24a enters into the notch 11a. The upper end 24b of light-blocking member 24 is located in front of the input end of a light-conducting element 26, the latter being integrated into the mount assembly 2a for the camera objective. The output end of light-conducting element 26 is located in the region of the edge of the film in cassette 3. The camera release member 9, already referred to, is mounted for longitudinal displacement by stationary guide pins 1a. Camera release 9 is biased leftwards towards undepressed position by a compression spring 9a. A pawl 10 is pivotally mounted on a pin 10b secured on release 9. Pawl 10 is biased clockwise by a tension spring 10a, and its clockwise movement is limited by a leftwardly yielding resilient stop member 9b on release 9.

The upper end of pawl 10 is provided with a doubly inclined camming surface 10c, 10d which, during longitudinal displacement of release member 9, rubs along the lower end 24a of light-blocking member 24, either forcing the member 24 inwards (leftwards as viewed in FIG. 3a) or else forcing the upper end of pawl 10 downwards; this is described in greater detail below. As most clearly shown in FIG. 3a, a tension spring 24d urges light-blocking member 24 counterclockwise, and this counterclockwise turning of member 24 is limited by a stationary stop 1 on the camera housing.

The arrangement depicted in FIGS. 3 and 3a–3d operates as follows:

As shown in FIG. 3, the selector switch 4 is in its "0" setting, and depression of camera release 9 will not activate the camera, inter alia because the lower left end of lever 18 is in the path of motion of the stop 22a of the shutter 22 preventing the shutter 22 from operating.

The operator turns selector switch 4 clockwise through an angle beta to the left "18" or motion-picture setting, wherein the camming pin 4b moves to location $A_1$ on cam surface 12a. Camming pin 4b displaces rod 12 upwards a predetermined first distance, lever 13 swings counterclockwise (as viewed in FIG. 3) a corresponding distance, and the stop 13b on lever 13 moves down a corresponding first distance.

If now the camera release member 9 is depressed by the user in the direction of arrow 21 in FIG. 3, the right end of release 9 presses lever 15 counterclockwise, causing the lever 18 which is rigidly connected to lever 15 to likewise swing counterclockwise, until lever 18 is stopped by stop projection 13b, at which point lever 15 will have assumed the position A shown in broken lines in FIG. 3. At this position, the free end of lever 18 is located radially intermediate the two stops 22a, 22b of rotary shutter 22, i.e., so as to be located in the path of movement of neither of them. Accordingly, the (non-illustrated) drive mechanism for the motion-picture camera can now drive the rotary shutter and film transport mechanism in the motion-picture mode of operation. With selector switch 4 in this setting (pin 4b engaging camming surface location $A_1$), no automatic provision of end-of-scene frame markings on the film is performed by the camera.

If the selector switch 4 is now turned clockwise one more step to the left "1" or single-shot setting, camming pin 4b moves to camming surface location $B_1$ and upwardly displaces rod 12 by a further amount, such that lever 13 turns further counterclockwise and stop member 13b drops further. In this setting, if the user now depresses camera release 9, the rigidly coupled levers 15, 18 turn counterclockwise further than described above, until lever 18 is stopped against member 13i b and lever 15 assumes the position B shown in broken lines in FIG. 3. Now the free end of lever 18 is located in the path of motion of the radially inward stop member 22b of shutter 22. In per se conventional manner, stop member 22b is utilized for causing the motion-picture camera to operate in the single-exposure mode. I.e., at the start of the exposure one side of the free end of lever 18 rests against stop member 22b, the shutter 22 then rotates through 360° in this example, and the stop member 22b comes to a stop against the other side of the free end of lever 18. The shutter 22 can be activated again, i.e., for another single-frame exposure, only by first letting go of camera release 9 and then depressing it once more.

When camera release 9 is depressed and then let go of, for either of these two selector-switch settings $A_1$ and $B_1$, the pawl 10 operates as follows: Because for the $A_1$ and $B_1$ settings the selector switch 4 has been turned clockwise, the notch 11a in rack 11 is located rightward of the lower end 24a of light-clocking member 24 as viewed in FIG. 3, and the lower end 24a of member 24 is located rightward of the unnotched upper part of rack 11 as viewed in FIG. 3a. When now the release 9 moves rightward (as viewed in FIG. 3) to retracted position, the doubly inclined camming surface 10c, 10d at the upper end of pawl 10 slides across the surface of the lower end 24a of member 24. Doubly inclined camming surface 10c, 10d is shaped such that it does not now try to move member 24 inward (clockwise in FIG. 3a), and furthermore the lower end 24a of member 24 is blocked by the unnotched upper part of rack 11. Accordingly, pawl 10 tilts counterclockwise (as viewed in FIG. 3) about its pin 10b, against the action of tension spring 10a, until the upper end of pawl 10 skips from a position located to the left of the lower end 24a of member 24 (i.e., as viewed in FIG. 3), to a position located to the right of the lower end 24a of member 24. Then when the user lets go of release 9 and the latter moves in the direction of arrow 20, pawl 10 travels leftward (as viewed in FIG. 3), and its doubly inclined camming surface 10c, 10d attempts to displace light-blocking member 24 inward (clockwise as viewed in FIG. 3a) but cannot, because as before the lower end 24a of member 24 is blocked by the unnotched part of the rack 11. Accordingly, the upper end of pawl 10 hits against the right face (as viewed in FIG. 3) of the lower end 24a of member 24, pawl 10 tilts clockwise (as viewed in FIG. 3) about its pin 10b against the limited resistance of resilient stop 9b, until the upper end of pawl 10 skips from a position located to the right of the lower end 24a of member 24, to a position located to the left thereof.

Accordingly, when the camera release 9 is depressed with the selector switch 4 in the $B_1$ setting, single-exposure operation is performed, but the camera does not automatically provide single-exposure frame markings on the film.

If the user instead turns selector switch 4 counterclockwise to the right "18" or motion-picture setting, wherein camming pin 4b moves to location $A_2$ on cam surface 12b, the rod 12 is upwardly shifted by the first amount described above and the camera will operate in the motion-picture mode when the camera release 9 is depressed, but now the camera will provide end-of-scene frame markings on the film in response to the letting go of camera release 9 at the end of the shooting of a motion-picture scene. Specifically, this clockwise turning of selector switch 4 to the $A_2$ setting causes rack 11 (as viewed in FIG. 3) to move leftwards to a position wherein its notch 11a registers with the lower end 24a of light-blocking member 24. The light-blocking member 24 does not yet change position, because as shown in FIG. 3a it is being pulled against a stop 1 on the camera housing by the tension spring 24d. When now the camera release 9 is depressed in the direction of arrow 21 in FIG. 3, the rightward face of the doubly inclined camming surface 10c, 10d on the upper end of pawl 10 presses against the lower end 24a of light-blocking member 24. However, the camming surface 10c, 10d is so shaped that it does not try to depress member 24 inwardly (clockwise in FIG. 3a) during depression of camera release 9. Accordingly, as before, the pawl 10 tilts counterclockwise (as viewed in FIG. 3) about its pin 10b, against the force of tension spring 10a, until the upper end of pawl 10 skips from a position located to the left (as viewed in FIG. 3) of the lower end 24a of member 24, to a position located to the right thereof. Motion-picture filming is initiated. When the user lets go of camera release 9, compression spring 9a moves release 9 in the direction of arrow 20. The doubly inclined camming surface 10c, 10d at the upper end of pawl 10 now hits against the right surface (as viewed in FIG. 3) of the lower end 24a of light-blocking member 24, and depresses light-blocking member 24 inwardly (clockwise as viewed in FIG. 3a) against the action of tension spring 24d. The pawl 10 does not at this time merely tilt clockwise as viewed in FIG. 3, but instead positively displaces the lower end 24a of member 24 inward, because the resilient stop 9b bearing against the lower end of pawl 10 prevents clockwise tilting of pawl 10 except in the case where the lower end 24a of member 24 is blocked by the unnotched part of rack 11 and cannot be pressed in, tension spring 24d providing only a relatively low biasing force. Accordingly, the doubly inclined camming surface 10c, 10d on pawl 10 presses light-blocking member 24 to a position somewhat clockwise relative to that shown in FIG. 3a, enough to unblock the input end of light-conducting element 26. When, during the movement of release 9 in the direction of arrow 20, the pawl 10 has moved a little further and cleared the lower end 24a of member 24 altogether, tension spring 24d pulls light-blocking member 24 back to the position shown in FIG. 3a, once more covering the input end of light-conducting element 26. Because the brief unblocking of light-conducting element 26 occurs during the terminal phase of the return movement of camera release 9, the exposed film frame is still in a stationary condition. Accordingly, a light-exposure marking is provided at the edge of the film in cassette 3, at a position correlated with the last frame of the motion-picture scene just shot.

If the user turns selector switch 4 counterclockwise to the right "1" or single-exposure setting, wherein camming pin 4 moves to location $B_2$ of cam surface 12b, the camera will operate in the single-exposure mode when the camera release 9 is thereafter depressed by the user. Again, this counterclockwise position of selector switch 4 keeps the notch 11a in rack 11 in register with the lower end 24a of light-blocking member 24, and therefore in the manner just described light-blocking member 24 will briefly uncover light-conducting element 26 during the terminal phase of the return movement of release 9, i.e., when the user lets go of release 9. When operating in the single-exposure mode, a frame marking will be provided on each film frame which was exposed in the single-exposure mode.

Figure 3D:
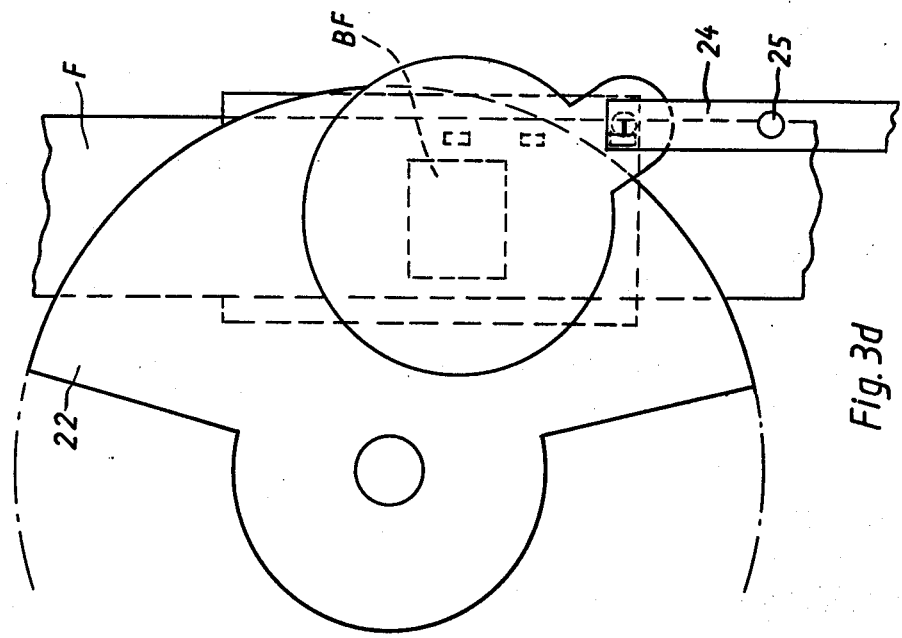
Figure 3C:
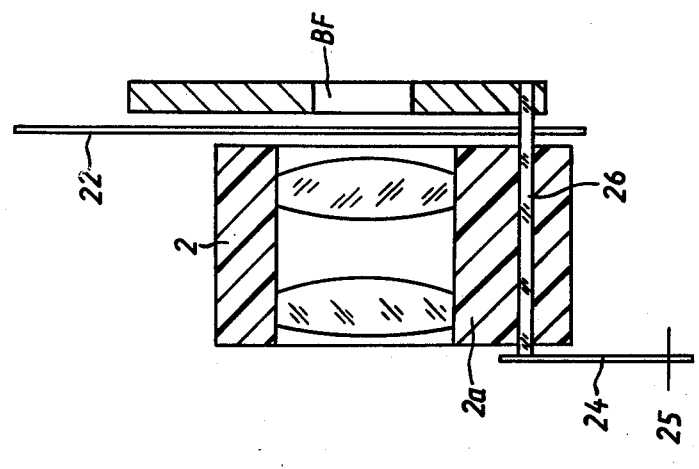

FIGS. 3c and 3d depict a particularly advantageous arrangement of the light-conducting element or bundle 26. The light-conducting element 26 is located outside the region of the sector-shaped rotary shutter 22 and is furthermore integrated into the structure of the mount 2a of the camera objective 2. In the case of Super-8 cassette film, the size of the exposure opening of the cassette is such that only very limited access space is present within which to locate an auxiliary exposure arrangement capable of projecting an exposed-light frame marking onto the film. Accordingly, in the event that cassette film of that type is employed in the camera, it is advantageous to locate the auxiliary exposure-light source a distance from the cassette exposure opening of about two interperforation intervals, as depicted in FIG. 3d.

FIG. 4 depicts another arrangement which automatically provides an auxiliary film exposure forming frame markings on the camera film. The selector switch 4, and cooperating components illustrated and already described with respect to FIGS. 3, 3a and 3b, is the same in this exemplary embodiment. The rack 11 carries at its left end a rigid contact 29 and a spring contact 29a. Depending upon the position assumed by rack 11, spring contact 29a is or is not located in the operative region of the pawl 30; the pawl 10 corresponds in purpose to the pawl 10 of FIGS. 3, 3a and 3b, and the positions of the rack in which contact 29a can and cannot be engaged by pawl 30 correspond to the positions of the rack 11 in FIGS. 3, 3a and 3b wherein the notch 11a of the rack does and does not register with the lower end 24a of the light-blocking member 24 of that embodiment. When camera release 9 is depressed rightwards pawl 30 does not close switch 29, 29a, irrespective of whether the user has selected the mode of operation wherein frame markings are to be provided. Then when the camera release 9 is let go of and returns leftwards, and assuming that the user has selected the provision of frame markings, the pawl 30 briefly closes switch 29, 29a. Pawl 30 is biased clockwise by a compression spring 31. When switch 29, 29a briefly closes, this briefly connects a battery 28 to the current supply lines of a light-emitting diode 27 located in correspondence to the output end 26b of the light-conducting element 26 of FIGS. 3 and 3a. Accordingly, during the terminal phase of the return movement of release 9, a brief flash of light exposes a single-shot or end-of-scene frame marking onto the edge of the film. The battery 28 is preferably the battery powering the transport mechanism of the camera.

Alternatively, the normally open-briefly closed switch 29, 29a could be replaced by a switch shaped to act normally closed-briefly open, i.e., so that the light-emitting diode 27 be normally energized and briefly deenergized upon letting go of camera release 9. In that event, during normal film transport operation a continuous bright band would be exposed onto the film edge as shown in FIG. 2k, interrupted by dark intervals M constituting end-of-scene frame markings. Furthermore, the light from this normally energized light-emitting diode could then be fed, via a light-conducting element, into the camera viewfinder to indicate to the user that the film transport mechanism is operating in the motion-picture mode; alternatively, the light-emitting diode could serve this purpose and be located in the viewfinder itself, with a light-conducting element transmitting light from the diode to the edge portion of the film for exposing the edge of the film. The brief disappearance of the light spot in the viewfinder, which would then result when the light-emitting diode is briefly deenergized at the end of the return movement of release 9, would not be disturbing to the user because, at the time when this occurs, the camera has already ceased operating and the light spot immediately reappears before the user could possibly begin to decide upon another interval of camera operation.

In the exemplary recording apparatuses described above, the coding technique employed merely involves the provision of a light or dark strip or dot at the edge of the film. However, in order to be able to use simple and reliably operating detectors in the mark-detecting circuitry of the reproducing apparatus in which such film is to be used, it may be advantageous to utilize a more complex coding technique, for example such as shown in FIG. 2g. When more complex code markings are to be provided, then it is advantageous to apply the code markings not with the camera stopped, but instead during film transport. Furthermore, it would then be particularly advantageous to apply the markings not during or upon completion of the exposure of a film frame, i.e., not during return of the camera release 9, but instead during the time camera release 9 is next thereafter depressed to perform the next single-exposure shot or to initiate filming of the next motion-picture sequence.

When the location of the frame marking is not determined by a light-blocking member but instead by brief energization or deenergization of a light-emitting diode, the desired position of the frame marking relative to the correlated film frame can be selected, within a range of selectability corresponding to the duration of a one-frame transport operation, by inserting a time-delay stage between the LED control switch and the remainder of the energizing circuit. Likewise, it is also possible to apply to the film the marking(s) for one film frame in a marking operation whose duration corresponds to a plurality of frame transport operations.

These possibilities are depicted in FIGS. 5a–c and 6. When the non-illustrated camera release member is depressed, a switch S1 (FIG. 6) closes, energizing a light-emitting diode D which continues to be energized until a capacitor C charges to a voltage rendering a transistor T non-conductive. The duration of this time interval is at most equal to the duration of a one-frame transport operation, and its particular value depends upon the single-processing means to be utilized in the reproduction apparatus. If the film regions on which the markings are to be provided have already been exposed with data, as in FIGS. 2a and 2b, so that a single dot-like frame marking or a cluster of such dot-like markings does not provide a reliably enough detectable indication, it is possible, with the markings being applied with the film in motion, to spread the markings out over plural frame steps.

The duration of the time delay in question can also be established by using, to terminate the time-delay interval, a phase-dependent contact which is opened or closed once per operating cycle of the film transport claw or rotary shutter.

Figure 5:
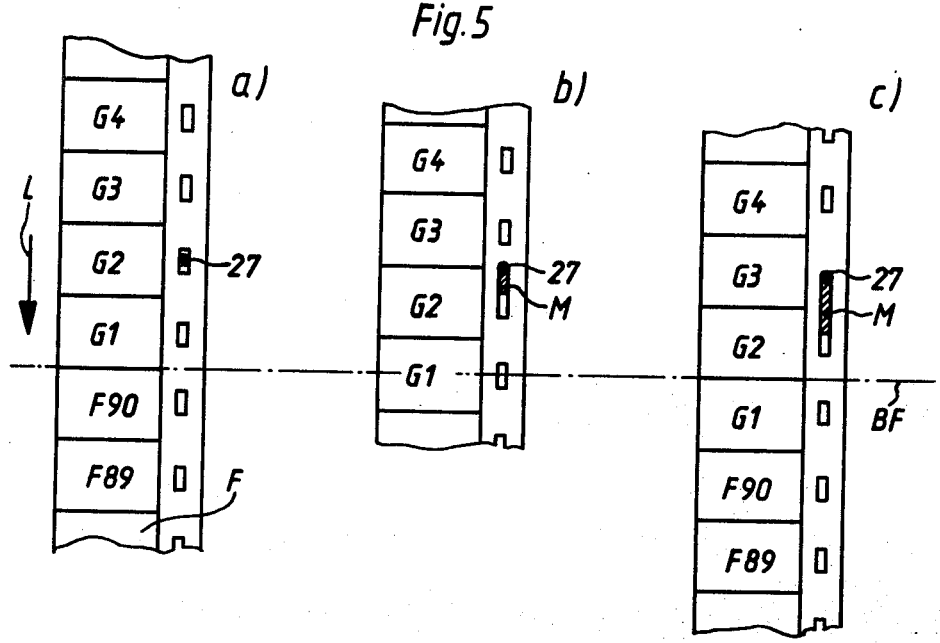
FIGS. 5a-5c depict the formation of a frame marking by relative movement between a light-emitting element and the film.
Figure 6:
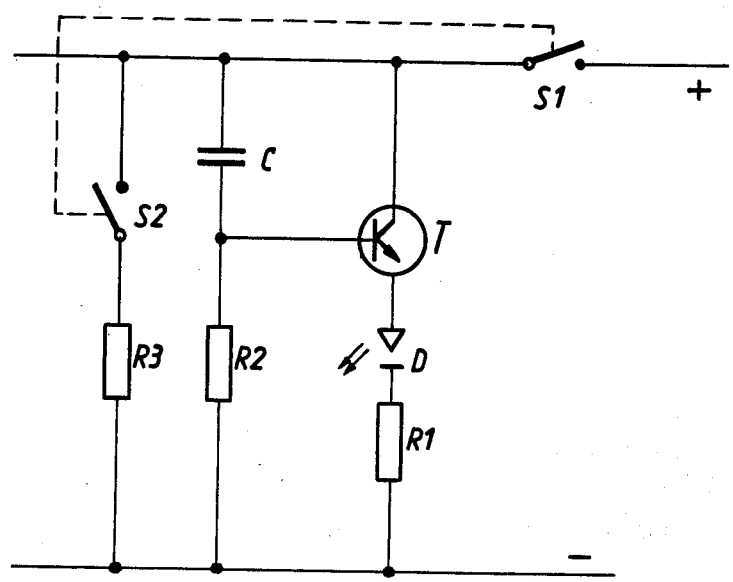
FIG. 6 depicts an electronic time-delay circuit which can be used to energize the light-emitting element utilized in FIGS. 5a-5c.

This technique is diagrammatically depicted in FIG. 5. G1–G4 and F89–F90 respectively denote the first four frames of a scene to be filmed and the last two films of the preceding filmed scene. Numeral 27 denotes the light-emitting element past which the edge of the film moves. The centerline of the film exposure window of the cassette is denoted by dash-dot line BF. The phase shift between the light-emitting element 27 and the exposure-window centerline here amounts to 1.5 times the interperforation interval. FIG. 5a depicts the film in the camera, not presently in transport. The light-emitting element 27 is located in the region of a film perforation. When, after the last frame F90 of the first scene leaves the exposure window, and the next scene is to be filmed, the timing circuit shown in FIG. 6 energizes light-emitting element 27, so that during the exposure and transport of frame G1 a connecting strip M is projected onto the film intermediate successive perforations, phase shifted relative to the associated film frame by 2.5 times the interperforation interval. Of course, this phase shift must be taken into account in the spacing between the projection window and marking detector of a corresponding reproducing apparatus. Accordingly, a strip exposure is made, such as shown in FIGS. 2h or 2i. The light-emitting element 27 can be caused to pulsate by including a modulator in its energizing circuit, which is particularly easy to do in the case of an LED, to produce a series of markings such as shown in FIG. 2g, which series may be easier to distinguish from preexposed symbols or the like than a solid stripe marking.

A purely mechanical marking technique is depicted in FIGS. 7a, 7b, 8 and 8a.

In FIG. 7a, the frame marking 57 is constituted by removal of a section of the edge of the film F alongside a film perforation and of a length less than that of the film perforation. In FIG. 7b, the frame marking 58 is constituted by the edge section of the film adjacent a film perforation and provided with a transverse cut at the trailing end of the film perforation, the film being transported in the direction of arrow L.

FIGS. 8 and 8a depict a mechanism capable of making the markings 57, and also modifiable for making the markings 58. The film F passes over a support 62. The tooth 63a of a film transport claw 63 enters into film perforations P. Claw 63 is supported against the film by a support spring 64 and is kept in the proper plane by a guide element 63d. I.e., the transport claw 63 acts as a drag-type transport claw; when it is travelling rightwards (in the film transport direction) its tooth 63a drops into a film perforation and begins to press against the leading edge of the perforation to advance the film; when the claw 63 is travelling leftwards (its return movement), the sloping surface of tooth 63a causes the claw to rise up out of the perforation P onto the portion of the film intermediate successive perforations. The mechanism imparting the back and forth reciprocation to the transport claw 63 is here schematically represented by a crank 64 whose crank pin extends into the slot intermediate two bent-up projections on the end of claw 63, and which is to be understood to reciprocate the claw with an amplitude corresponding to the length of a film frame. The claw 63 is provided with two laterally extending blades 63b, 63c (extending towards the viewer in FIG. 8, and seen from above in FIG. 8a) located such as to produce cuts outwardly of the perforation, i.e., as shown in FIG. 7a. The laterally extending blades 63b, 63c are located higher than the tooth 63a of the claw 63, so that during normal motion-picture film transport the tooth 63a slips into a perforation P, advances the film by one frame, slides up out of the perforation at the trailing end thereof, and then drops into the next perforation, but with the blades 63b, 63c always located above the plane of the film F and therefore incapable of cutting into it. A camming roller 65a is rotatably mounted at the end of a lateral arm of a member 65, here schematically depicted as connected to a pushbutton 68, with a tension spring 67 resisting depression of member 65 in the direction of arrow 66. If the user depresses member 65 while the film is at a standstill, the camming roller moves down into the path of movement of the upper slanted cam surface of claw 63, not yet engaging the cam surface. Then when film transport begins and the claw 63 moves rightwards in FIG. 8, the upper slanted cam surface engages camming roller 65a and drives the claw deeper than normally into the film perforation P, thereby causing the blades 63b, 63c to cut out a marking 57 such as shown in FIG. 7a. The camming roller 65a is so located that the blades 63b, 63c cut through the film F midway between initiation and termination of a one-frame film advancement. Of course, it will be understood that this occurs with the right face of the tooth 63a pressing against the right edge of the film perforation P during the film advancement. Making these two cuts in the middle of the film advancement is especially advantageous, for the following reasons. If the cut were to be made just subsequent to completion of the one-frame film advancement, and its non-zero duration overlapped into the exposure time interval of the film, then the making of the cut could move the film during exposure, resulting in a loss of image sharpness. Likewise, if the cut were to be made subsequent to completion of the one-frame film advancement and before the exposure per se is initiated, this would in the motion-picture mode lessen the fraction of the interval intermediate transport operations available for the exposure per se, reducing photographic efficiency. Accordingly, it is preferred that the cut be made midway in time between initiation and termination of the one-frame transport operation, so that performance of the cut will neither move the film during an exposure nor reduce the time available for an exposure. In FIG. 8, for the sake of simplicity, member 65 is shown actuated by a pushbutton 68, requiring the user to manually effect a cut each time a marking is to be made. It will be understood, however, that it would typically be preferred to couple the member 65 to the release member of the camera in such a manner that, each time the release member is depressed by the user, i.e., once per depression, the camming roller 65 depresses the claw 63, so as to provide a single-exposure or end-of-scene frame marking upon initiation of the next single-exposure shot or next scene. For example, member 65 could be coupled to the armature of an electromagnet whose winding is energized for a limited time interval each time the camera release is depressed by the user, once per depression.

One of the two cutting blades 63b, 63c can be omitted, preferably the one 63c which is located more downstream, as considered in the film-transport direction, the remaining blade 63b then being preferably located further back than shown in FIG. 8 in order to form a cut 58a near to the trailing end of the film perforation, i.e., as shown in FIG. 7. It is advantageous to form the cut 58a near or at the trailing end of the perforation, because then the flap or tongue of film material running alongside the film perforation extends in the direction opposite to film transport and therefore cannot rise up and catch against a film transport member or other mechanical component.

Alternatively, the cutting blades 63b, 63c could be depressed when the user lets go of the camera release member. A further advantage of performing the cut with the film in motion and with the cutting blades on the transport claw is that the cutting blades travel with the film during this time, and there can be no relative movement between the blades and the film in the direction of film transport, especially due to the fact that the right face of the transport tooth 63a engages the leading edge of the film perforation P and stabilizes the film against improper shifting. It would also be possible to provide the single-exposure and end-of-scene frame markings with the film at a standstill, after completion of shooting, by manually pressing the transport claw 63 down, e.g., through the intermediary of a suitable coupling; providing the markings in this way, i.e., prior to reinitiating camera operation, actually does not tend to interfere with proper frame positioning, because with conventional film-transport mechanism the transport claw will ordinarily have moved to a location intermediate its end positions at the time that the transport mechanism shuts off.

A particular advantage of providing the frame markings using this purely mechanical technique is that the detectors for these markings can readily distinguish between these markings and information preexposed onto the edge region of the film. Furthermore, mechanical markers and mark detectors tend to be rather simple in construction and inexpensive. Also, even if one of these notches or cuts is bridged by a piece of splicing foil, the marking can still be mechanically detected because the mark detector when it engages the notch or cut will cause the flexible splicing foil to yield. If the single-exposure and end-of-scene frame markings are not automatically provided in the camera, but instead are provided in a reproducing apparatus, then the use of the purely mechanical technique is particularly simple and appropriate.

Rather unexpectedly, it has been found that the provision of notches or cuts such as described above do not detectably interfere with proper film transport. Also, it is particularly advantageous that the detector for such notches or cuts move into engagement therewith normal to the plane of the film. In that event, the motion performed by the marking detector and by the cutting blades will be in the same direction relative to the film. In the case of a simple reproducing apparatus, this opens up the convenient possibility of providing the marking detector with a cutting blade, which is particularly simple from the structural viewpoint. In the simplest case the transport claw of the reproducing apparatus is provided with one or more cutting blades, as in FIG. 8; this makes it unnecessary to introduce an offset or phase shift as between frame markings and their associated frames, which is desirable when film is to be edited and spliced.

Instead of providing the frame markings by light exposure or by mechanical means, the invention additionally contemplates the magnetic recording of frame markings or signals. Motion-picture film provided with one or two audio tracks is of course well known. Often such film is packaged in special sound-film cassettes provided with an auxiliary apening through which the sound-recording head of the motion-picture camera can engage the sound track on the film. More recently, however, sound-film cassettes are provided with an exposure opening through which the sound-recording head too can engage the film. Such film typically comprises two sound tracks, namely the actual audio track which runs along the film edge opposite to that at which the film perforations are provided, and a balance track running along the perforated edge of the film and serving to mechanically compensate for the presence of the audio track at the other edge. Accordingly, the balance track can be readily utilized for recording single-exposure or end-of-scene markings or signals.

Preferably, the frame-signal recording head of the camera would then be located in the vicinity of the exposure window of the film cassette, i.e., at a position corresponding to that of the light-emitting element in the optical-marking embodiments described above, for the sake of compatibility between optical and magnetic recording of frame markings. The intermittent transport of the audio track in the region of the cassette exposure window is of no particular significance because, unlike the recording of a true audio track, the frame markings or signals to be recorded will have, for example, the form of simple pulses and pulse combinations. Furthermore, magnetic recording of frame markings has the advantage that the markings can be later erased. Also, using magnetic recording it is particularly easy to provide markings of distinguishable character. For example, the frame markings may be recorded pulses of differing pulse-length and/or frequency. Inasmuch as such a magnetic recording technique for the frame markings does not fundamentally differ from the optical techniques already described, separate depiction of this alternative is unnecessary. For example, the switch 29, 29a of FIG. 4 could be used, not to energize a light-emitting diode, but instead to briefly switch on a frame-marking recording circuit. The recording circuit could, for example, include a modulated signal source providing the frame marking or signal per se, the recording head being located in the same way as the light-emitting elements already described. There would then be recorded on the balance track simple pulses or pulses of oscillating signals, which in the reproducing apparatus would be detected by a pick-up head. Preferably, the magnetic recording of frame markings is performed upon reinitiation of camera operation, i.e., in the manner explained with respect to the optical techniques. Because the auxiliary recording head is located in the intermittent-transport region of the cassette exposure window, it will not cramp or otherwise interfere with the audio recording unit of the camera.

In principle, it would certainly be possible, as an alternative, to record the frame markings not on the balance track but instead on the audio track itself. This has the advantage that the audio track is located at the edge of the film opposite to that provided with the film perforations, so that the recording head for the frame signals can be more easily positioned out of the way of the film-transport claw of the camera. Of course, it would then not be possible to record a usual audio signal in super-position upon the frame signals, without resorting to special measures. The frame signals could be very low or high frequency signals, outside the frequency range of human hearing, and be distinguished from the audio signal on the audio track by means of frequency separators or filters. In that event, however, there is some danger that when dubbing or rerecording the audio track the frame signals will become erased along with the audio signal.

In the foregoing, for explanatory purposes, the invention has been illustrated in the context of cinematographic equipment. However, the inventive concepts are equally applicable, for example, to video recording using magnetic or optical image-recording techniques. With present-day video recording systems of the oblique-track magnetic-tape type, or of the type comprising rotating so-called "image plates," the persistent reproduction of an end-of-scene frame is possible by interrupting tape transport and repeatedly scanning the data pertaining to such frame. Such tape could then be provided with frame markings of the type already described, for example on its synch track or synch tape, alongside or superimposed on the recorded picture signal.

Reproducing equipment capable of stopping the motion-picture film in response to a single-exposure or end-of-scene frame marking, and persistently projecting an image of the frame in question for a predetermined time interval, or until commanded to continue film transport, is disclosed in our copending application entitled "REPRODUCING OF INTERSPERSED MOTION-PICTURE SCENES AND STILL SHOTS," filed on the same day herewith, the entire disclosure of which is incorporated herein by reference.

It will be understood that each of the elements described above, or two or more together, may also find a useful application in other types of constructions and circuits differing from the types described above.

While the invention has been illustrated and described as embodied in a cinematographic context, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In an apparatus for recording motion pictures on a recording medium, in combination, means for recording successive image frames on successive portions of the recording medium; and marking means operable by the user for providing the recording medium with interrupt-transport markings correlated with predetermined image frames, whereby when the recording medium is run through a reproducing apparatus provided with a marking detector the detection of the interrupt-transport markings can be used to interrupt recording medium transport and persistently reproduce the predetermined image frames as still images, the recording medium being photographic motion-picture film provided with film-frame perforations running alongside one longitudinal edge of the film, the marking means comprising cutting means for making cuts in the film extending transversely to the direction of elongation of the film from such perforations to the nearer of the two longitudinal edges of the film, the apparatus including a film transport mechanism, the film transport mechanism including a film transport claw which enters into film perforations for intermittent transport of the film, the cutting means being provided on the film transport claw and normally not cutting the film, and furthermore including means for displacing the transport claw into a position in which the cutting means cuts the film and produces an interrupt-transport frame marking.

2. In an apparatus as defined in claim 1, the cutting means being shaped to produce two such transverse cuts, so that a marginal portion of film adjoining a film perforation falls off the film.

3. In an apparatus as defined in claim 1, the cutting means forming a single transverse cut located nearer to the trailing than to the leading end of a film perforation, so that the flap or tongue of film preceding the cut extends opposite to the film transport direction.

* * * * *